(No Model.)
E. E. JOSEF.
CAR WHEEL.
No. 265,965. Patented Oct. 17, 1882.
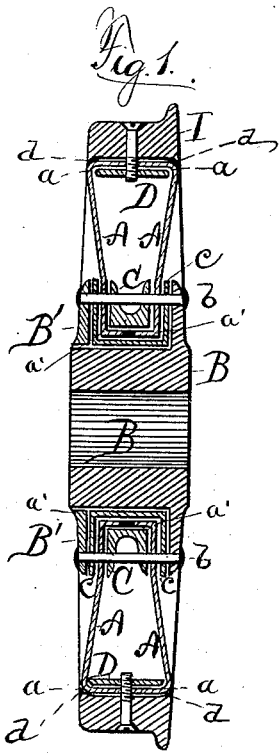
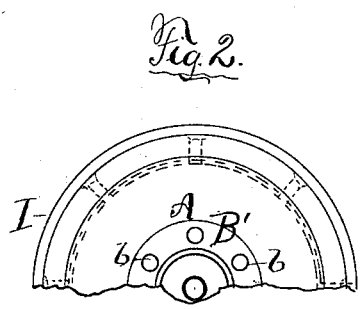
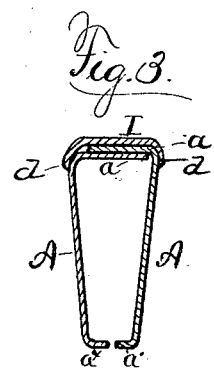
Witnesses
E. A. Gay
J. R. Drake
Inventor
E. E. Josef
by
J. R. Drake
atty.

UNITED STATES PATENT OFFICE.

EDWARD E. JOSEF, OF BUFFALO, NEW YORK.

CAR-WHEEL.

SPECIFICATION forming part of Letters Patent No. 265,965, dated October 17, 1882.

Application filed March 13, 1882. (No model.)

*To all whom it may concern:*

Be it known that I, EDWARD E. JOSEF, a citizen of the United States, residing at Buffalo, in the county of Erie and State of New York, have made certain Improvements in Wheels for Locomotives, Cars, &c., of which the following is a specification.

This invention relates to improvements in the construction of metal wheels, more especially for locomotives, cars, and for other vehicles and purposes for which they can be advantageously used, and is an improvement on my patent of June 22, 1880, No. 229,138, for "improvements in wheels and pulleys," that being more particularly for wheels and pulleys for belting for machinery purposes, while this is for purposes above stated.

The invention consists in the construction of the device, as hereinafter explained, and in combination with locomotive or other tires shrunk on or otherwise fastened to the wheel.

In the drawings, Figure 1 is a vertical cross-section through the entire wheel and a car-tire attached thereto; Fig. 2, a side elevation of one-half of a wheel, and Fig. 3 a detail of variation in the manner of uniting the disks.

A A represent two separate disks, of metal, wrought or otherwise, forming the sides of the wheel, concaving in the center and narrowing at the base or at their junction with the hub B. The periphery of the disks is formed by their being bent over into flanges *a a*, the two ends abutting together in the center, or else one flange overlapping the other, as shown in Fig. 3, the bottom or base of each disk having inward flanges *a′ a′*. The hub is formed of two parts, the main portion B being cast in one piece, forming the hub and one side. The other side, B′, is cast as a separate ring, and when the base of the disks A A *a′ a′* is set in position this side ring, B′, is fastened on by bolts *b b*, or screwed on. Before this is done a central separating and stiffening collar, C, is put in and around the hub B and inside between the two disks A A, as shown in Fig. 1.

Outside the base of the disks set in the hub, and between the hub and sides and bottom of the disks, is a washer, *c*, in one or more pieces, made of rubber, leather, paper, or any suitable non-conducting and non-vibrating substance, and is thus placed to take off or absorb the shock incident to the running of wheels. This is an important feature, as it prevents wear and noise to a great extent, and making the wheels more durable.

Inside the periphery of the disks A A is a metal ring, D, for strengthening the wheel and also for securing the tire thereto, as shown in Fig. 1, though, if the flanges *a a* of the disks overlap and are made thick, this stiffening-ring D might be dispensed with, as shown in Fig. 3.

I is a tire, which is shrunk on or otherwise attached to the periphery of the wheel, but is mainly kept on by the projecting edges or flanges *d d*, and which partly inclose the edges of the disks A A, as shown in Fig. 1 and also in Fig. 3, where the tire I is for an ordinary wheel, and is of course much thinner than a car-wheel tire.

In Figs. 1 and 2 screws are shown going through the tire, disks, and stiffening-ring D, and which may or may not be employed.

The bolts *b b* go through the side of the hub B, washer *c*, disks A A, central collar, C, and the removable side of the hub B′. This side is made removable for the purpose of setting in the central collar, C, and the washer *c*, as before described.

This construction of the whole gives a light, flexible, hollow wheel of great strength and durability, and a perfectly-balanced one.

I claim—

1. The wheel consisting of the sectional hub B B′, the flanged disks A A *a a a′ a′*, and central separating and strengthening collar, C, all fastened together by bolts *b b* or screws, and with or without the ring D, all in combination with any suitable independent tire fastened around the periphery of the disks A A, substantially as and for the purpose specified.

2. In combination with the hub B B′ and disks A A of a wheel, the non-vibrating washer *c*, (of rubber, leather, paper, or other non-vibrating material,) arranged in connection therewith, substantially as and for the purpose specified.

In witness whereof I have hereunto signed my name in the presence of two subscribing witnesses.

EDWARD E. JOSEF.

Witnesses:
J. R. DRAKE,
T. H. PARSONS.